United States Patent

Shoji et al.

[11] Patent Number: 5,309,177
[45] Date of Patent: May 3, 1994

[54] IMAGE RECORDING APPARATUS

[75] Inventors: Hisashi Shoji, Kawasaki; Tomoko Ogawa, Tokyo, both of Japan

[73] Assignee: Ricoh Company, Ltd., Tokyo, Japan

[21] Appl. No.: 865,672

[22] Filed: Apr. 8, 1992

Related U.S. Application Data

[63] Continuation of Ser. No. 631,084, Dec. 19, 1990, abandoned.

[30] Foreign Application Priority Data

Dec. 19, 1989 [JP] Japan .................. 1-327316
Dec. 19, 1989 [JP] Japan .................. 1-327317
Dec. 19, 1989 [JP] Japan .................. 1-327318
Oct. 15, 1990 [JP] Japan .................. 2-273207

[51] Int. Cl.$^5$ .................. B41J 2/47; H04N 1/21
[52] U.S. Cl. .................. 346/108; 358/298
[58] Field of Search .................. 346/108, 107 R, 160; 358/298, 296, 300, 302; 355/208

[56] References Cited

U.S. PATENT DOCUMENTS 4,709,250 11/1987 Takeuchi .................. 346/160
4,989,096 1/1991 Webb et al. .................. 358/298

Primary Examiner—Mark J. Reinhart
Attorney, Agent, or Firm—Mason, Fenwick & Lawrence

[57] ABSTRACT

An image recording apparatus for electrostatically forming a latent image on an image carrier by driving optics in response to multi-level image data. Before the start of an actual image recording operation, a latent image in the form of a test pattern having a plurality of tones is formed on the image carrier by pulse width modulation. A table for correcting image data is generated on the basis of sensed surface potentials of the test pattern. A semiconductor laser included in the optics is driven such that the tone data and the latent image potential remains in a constant relation.

9 Claims, 14 Drawing Sheets

IMAGE RECORDING APPARATUS

This application is a continuation of U.S. patent application Ser. No. 07/631,084, filed Dec. 19, 1990 now abandoned.

BACKGROUND OF THE INVENTION

The present invention relates to an electrophotograpic image recording apparatus and, more particularly, to an image recording apparatus of the type driving optics in response to multi-level image data to electrostatically form a latent image on an image carrier.

An electrophotographic image recording apparatus such as a copier or a laser printer has optics or an image reader for reading an image to be recorded. Image light representative of the read image scans a photoconductive element, or image carrier, to electrostatically form a latent image thereon. A developing unit develops the latent image to produce a toner image. The toner image is transferred to a paper sheet, or recording medium, and then fixed on the sheet by a fixing unit. Regarding a photograph or similar halftone image, it has been customary for an image processing section incorporated in this type of apparatus or a host computer to produce quasi-halftone image data from two-level data by use of a dither method or a density pattern method. The apparatus drives the optics in response to such quasi-halftone image data to thereby form an electrostatic latent image on the photoconductive element. Specifically, while the writing operation of the optics is based on two levels per pixel, halftone is rendered by adequately distributing pixels on which a toner deposits and pixels on which it does not deposit. The density is determined by the ratio of the pixels with a toner to the entire pixels. This kind of approach is successful in reducing the volume of image data and, therefore, in promoting efficient image transfer and storage. However, an increase in the number of tones directly translates into a decrease in resolution and undesirably highlights particular patterns in a reproduction. It is therefore difficult to enhance reproducibility in both of two different kinds of image areas, i.e., a character or similar area that needs high resolution and a photograph or similar area that needs faithful representation of tones.

Another conventional approach for rendering halftone consists in varying the exposing level of a semiconductor laser included in the optics in multiple steps by power modulation or varying the emission time thereof in multiple steps by pulse width modulation. If this kind of approach can control the tones of an image, the problem discussed above will be eliminated. However, the number of exposing levels available with the power modulation scheme, i.e., the modulation of a current for driving the laser is limited. Specifically, the relation of the optical attenuating characteristic of the photoconductive element and the laser drive current to the emission intensity is apt to change due to the changes in ambient conditions and deterioration of the photoconductive element, etc. Then, when a great number of exposing levels are set, the relation between the tones of input image data and the tones of a latent image to be formed on the photoconductive element will be noticeably changed. On the other hand, when the emission time is changed in multiple steps by modulating the pulse width, the potential of a latent image changes, resulting in the same phenomenon as stated in relation to power modulation. This prevents the image recording characteristic from being unconditionally determined and thereby renders the reproducibility of tones unstable.

There has also been proposed a method which measures the intensity of a laser beam issuing from a semiconductor laser and feeding back the measured intensity to the current which drives the laser. However, with a conventional apparatus implemented with this method, it is difficult to measure a tone represented by a particular amount of exposure. This kind of scheme would fail to suppress the fluctuation of optical attenuation characteristic, also resulting in an unstable recording characteristic. While Japanese Patent Laid-Open Publication Nos. 204741/1989 and 204743/1989 each shows and describes a control method relying on tone correction, they are not of the type detecting the image forming conditions of an image recorder and, therefore, not capable of eliminating the problems stated above.

SUMMARY OF THE INVENTION

It is therefore an object of the present invention to provide an image recording apparatus which varies the tone of a single pixel in multiple steps and, yet, insures an image with faithful tone reproducibility and high resolution.

It is another object of the present invention to provide a generally improved image recording apparatus.

An image recording apparatus for electrostatically forming a latent image on a photoconductive element by scanning the photoconductive element by a laser beam which a semiconductor laser driven by image data emits, and developing the latent image to produce a visible image of the present invention comprises a first driving section for driving the laser by modulating a pulse width by multiple levels which are based on the image data, a second driving section for driving, before the visible image is formed, the first driving section by generating laser drive data having a plurality of tones, a potential sensor for sensing a surface potential of a latent image electrostatically formed on the image carrier by the second driving section, and a table generating section for generating, in response to a potential sensed by the potential sensor, a table for correcting image data such that a set relation holds between tone data and latent image potential.

Also, an image recording apparatus for electrostatically forming a latent image on a photoconductive element by scanning the photoconductive element by a laser beam which a semiconductor laser driven by image data emits, and developing the latent image to produce a visible image of the present invention comprises a first driving section for driving the laser by modulating a drive current for driving the laser by multiple levels which are based on the image data, a second driving section for driving, before the visible image is formed, the first driving section by generating laser drive data having a plurality of tones, a potential sensor for sensing a surface potential of a latent image electrostatically formed on the image carrier by the second section, and a table generating section for generating, in response to a potential sensed by the potential sensor, a table for correcting image data such that a set relation holds between tone data and latent image potential.

Further, an image recording apparatus for modulating a drive current or an emission time in multiple levels in response to image data to drive a semiconductor laser, scanning a photoconductive image carrier by a laser beam issuing from the laser to electrostatically form a latent image on the image carrier, and developing the latent image to produce a visible image of the present invention comprises a latent image forming section for electrostatically forming a latent image in an image forming area of the image carrier in response to the image data, and electrostatically forming a latent image having a plurality of tones for tone correction in a non-image forming area of the image carrier, a potential sensor for sensing a potential of the latent image formed in the non-image forming area by the latent image forming section, and a table generating section for generating, in response to an output of the potential sensor, a table for correcting input image data such that a set relation holds between laser drive data and final image density.

Moreover, an image recording apparatus for modulating a drive current or an emission time in multiple levels in response to image data to drive a semiconductor laser, scanning a photoconductive image carrier by a laser beam issuing from the laser to electrostatically form a latent image on the image carrier, and developing the latent image to produce a visible image of the present invention comprises a first latent image forming means for electrostatically forming a latent image in an image forming area of the image carrier in response to the image data, and electrostatically forming a latent image having a plurality of tones for latent image tone correction in a non-image forming area of the image carrier, a potential sensor for sensing a potential of the latent image formed in the non-image forming area by the first latent image forming section, a first condition setting section for generating, in response to an output of the potential sensing section, a table for correcting input image data such that a set relation holds between laser drive data and final image density, a second latent image forming section for electrostatically forming a latent image having a plurality of tones for development tone correction in the image forming area of the image carrier, a reflection density sensor for sensing a reflection density of toner development applied to the latent image formed by the second latent image forming section, and a second condition setting section for setting a reflection density sensed by the reflection density sensor and a tone of the refraction density as a set value for the first condition setting section.

BRIEF DESCRIPTION OF THE DRAWINGS

The above and other objects, features and advantages of the present invention will become more apparent from the following detailed description taken with the accompanying drawings in which:

FIGS. 6A and 6B are collectively referred to herein as "FIG. 6".

FIGS. 7A and 7B are collectively referred to herein as "FIG. 7".

FIGS. 15A and 15B are collectively referred to herein as "FIG. 15"

DESCRIPTION OF THE PREFERRED EMBODIMENT

Figure 1:
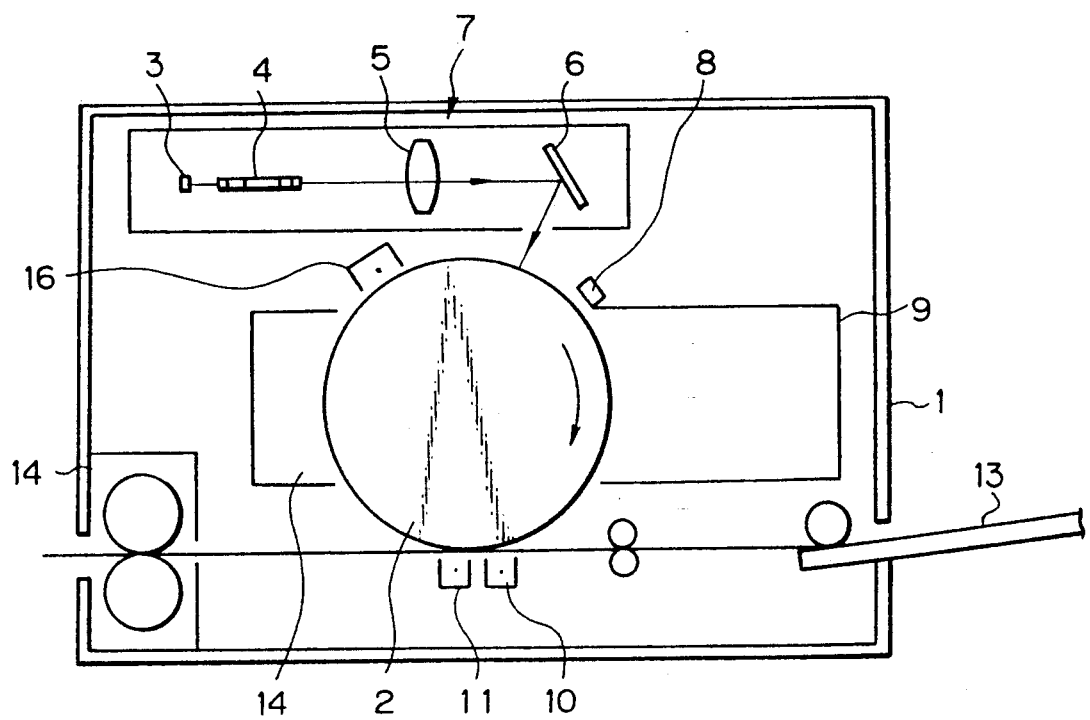
FIG. 1 is a section outlining an image recording apparatus embodying the present invention.

Referring to FIG. 1 of the drawings, an image recording apparatus embodying the present invention is shown and includes a housing 1. A photoconductive element or image carrier in the form of a drum 2 is incorporated in and located substantially at the center of the housing 1. Optics 7 is disposed above the drum 2 and made up of a semiconductor laser 3, a rotary polygonal mirror 4, a lens 5, and a mirror 6. A potential sensor 8 is located in close proximity to the surface of the drum 2 downstream of an exposing position which is defined by the optics 7. The potential sensor 8 senses the potential level of a latent image, as will be described. A developing unit 9 is positioned downstream of the potential sensor 8 for depositing a developer on the latent image formed on the drum 2 to produce a toner image. A transfer charger 10 is located downstream of the developing unit 9 and below the drum 2, while a separation charger 11 is located next to the transfer charger 10. A paper cassette 13 is removably mounted on the housing 1 in alignment with the transfer charger 10 in the horizontal direction. The paper cassette 13 is loaded with a stack of paper sheets. A fixing unit 14 is located downstream of and in alignment with the separation charger 11 in the horizontal direction. The wall of the housing 1 that faces the fixing unit 14 is formed with an opening for driving a paper sheet out of the housing 1. A cleaning unit 15 is located in the vicinity of the drum 2 downstream of the separation charger 11 and removes toner particles remaining on the drum 2 after image transfer. A main charger 16 is positioned downstream of the cleaning unit 15 for uniformly charging the surface of the drum 2 to predetermined polarity.

In operation, an image inputting unit implemented with CCDs (Charge Coupled Devices) or similar solid-state imaging devices reads an image such as a photograph. The output signal of the image inputting unit representative of the image is converted into image data by suitable signal processing means, the image data having eight bits per pixel for tone representation. The image data modulates a laser beam issuing from the semiconductor laser 3. The modulated laser beam is steered by the polygonal mirror 4 and then routed through the lens 5 and 6 to the exposing position of the drum 2 which has been charged by the main charger 16, whereby a latent image is electrostatically formed on the drum 2. As the drum 2 is rotated, the latent image is brought to a position where it faces the developing unit 9 and is developed by a toner. A paper sheet is fed from the paper cassette 13 and once stopped at a register position just ahead of the transfer charger 10. The paper sheet is driven from the register position to an image transfer position in synchronism with the arrival of the toner image on the drum 2 at the transfer charger 10. As a result, the toner image is transferred from the drum 2 to the paper sheet. The leading edge of the paper sheet carrying the toner image thereon is separated from the surface of the drum 2 by the separation charger 11 and then transported to the fixing unit 14. The fixing unit 14 fixes the toner image on the paper sheet by heat or pressure. Then, the paper sheet is driven out of the housing 1. Toner particles remaining on the drum 2 after the image transfer are removed by the cleaning unit 15. The so cleaned surface of the drum 2 is again charged by the main charger 16 to prepare for another image forming cycle.

Figure 2:
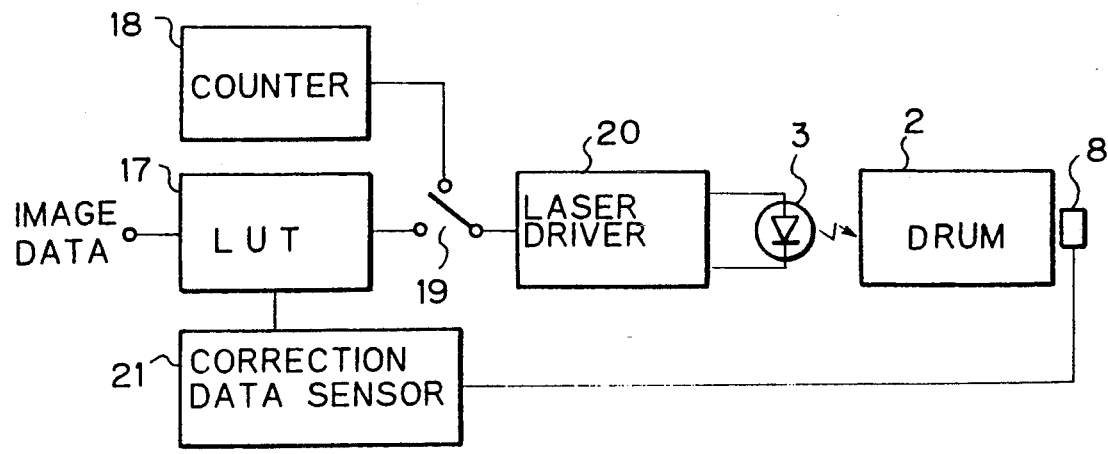
FIG. 2 is a block diagram showing a specific construction of a tone correcting section included in the embodiment.

FIG. 2 shows a specific construction of a tone correcting section incorporated in the apparatus of FIG. 1 for correcting tones. As shown, the tone correcting section has a look-up table (LUT) 17 and a counter 18 which counts data for driving the semiconductor laser 3. A switch 19 selects either one of the output of the LUT 17 and the output of the counter 18. The switch 19 is connected to a laser driver 20 which drives the laser 3. The potential sensor 8 is connected to a correction data setting section 21.

Figure 3:
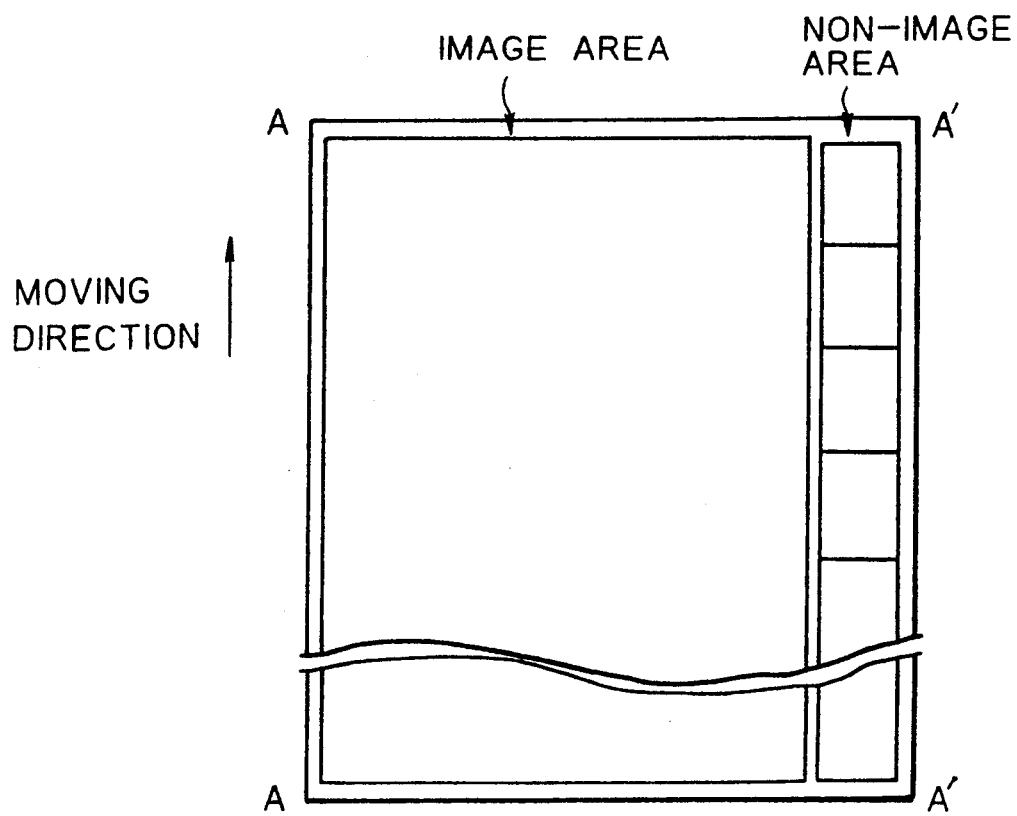
FIG. 3 shows a specific latent image pattern which the present invention may form.

The tone correcting section having the above construction is operated as follows. Before the start of an operation for forming a desired image, the switch 19 is connected to the counter 18 to feed laser drive data output by the counter 18 to the laser driver 20. Specifically, the counter 18 sequentially sends laser drive data whose tone increases at predetermined intervals to the laser driver 20 via the switch 19. The laser driver 20 converts each input laser drive data into a pulse width to control the duration of a particular current through the laser 3, thereby causing the laser 3 to emit. As a result, a latent image whose average potential changes stepwise is formed on the drum 2. This is also true with the previously mentioned power modulation scheme, although not described specifically. FIG. 3 is a developed view showing a specific latent image pattern, i.e., stepwise changes in average potential on the drum 2 (tones 1 to n) caused by the arrangement of FIG. 2.

Figure 4:
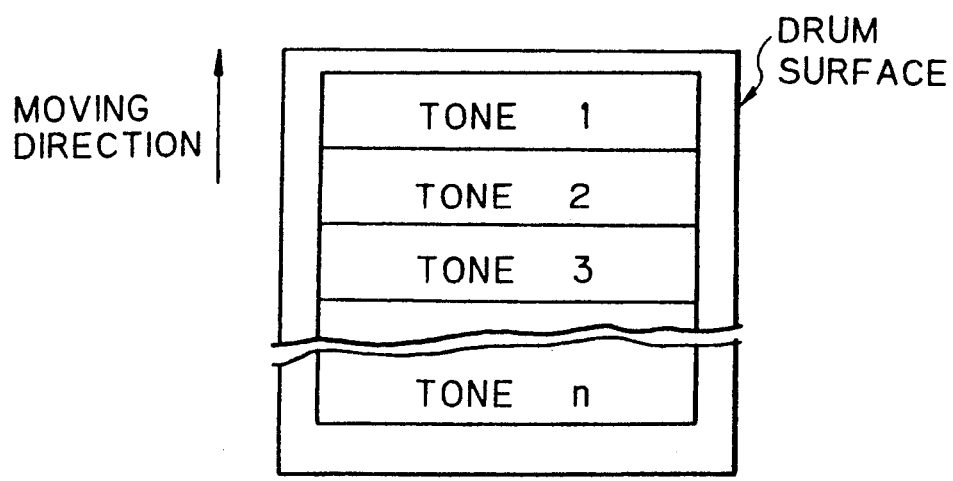
FIG. 4 shows another specific latent image pattern.

The potential sensor 8 measures the varying average potential of the latent image on the drum 2. The potential sensor 8 senses the potential over a particular area of the latent image, and this potential changes in proportion to the ratio of an area exposed in a dot pattern. In response to the output of the potential sensor 8, the correction data setting section 21 calculates correction data for correcting image data to be outputted from the LUT 17 and writes them in the LUT 17. In the event of actual image recording, the switch 19 is caused into connection with the LUT 17. The LUT 17 corrects input image data while delivering the corrected image data to the laser driver 20, so that the relation between the tone of image data and the average potential is maintained constant. On the other hand, in the case of pulse width modulation, the laser driver 20 converts each input data into a particular pulse width to control the duration of a particular current through the laser 3 and thereby causes the laser 3 to emit. By such a procedure, a latent image whose potential changes stepwise is formed on the drum 2. FIG. 4 is a developed view showing a specific condition wherein the average potential of the drum 2 is changed stepwise (tones 1 to n), i.e., a latent image pattern produced by the arrangement of FIG. 2.

Again, the potential sensor 8 measures the potential of the latent image formed on the drum 2 by pulse width modulation. The sensor 8 senses the potential over a particular area of the latent image. In the case of pulse width modulation, the potential changes in proportion to the ratio of an exposed area, i.e., the average potential is measured. Thereafter, a latent image formed in the image area of the drum 2 is developed, transferred, and then fixed to produce a recorded image. Subsequently, the correction data setting section 21 calculates correction data on the basis of the output of the potential sensor 8 and writes them in the LUT 17. At the time of image recording, the switch 19 is caused into connection with the LUT 17. In this condition, the LUT 17 corrects input image data and delivers the corrected image data to the laser driver 20. This is successful in maintaining the relation between the tone of image data and the average potential constant.

Figure 5:
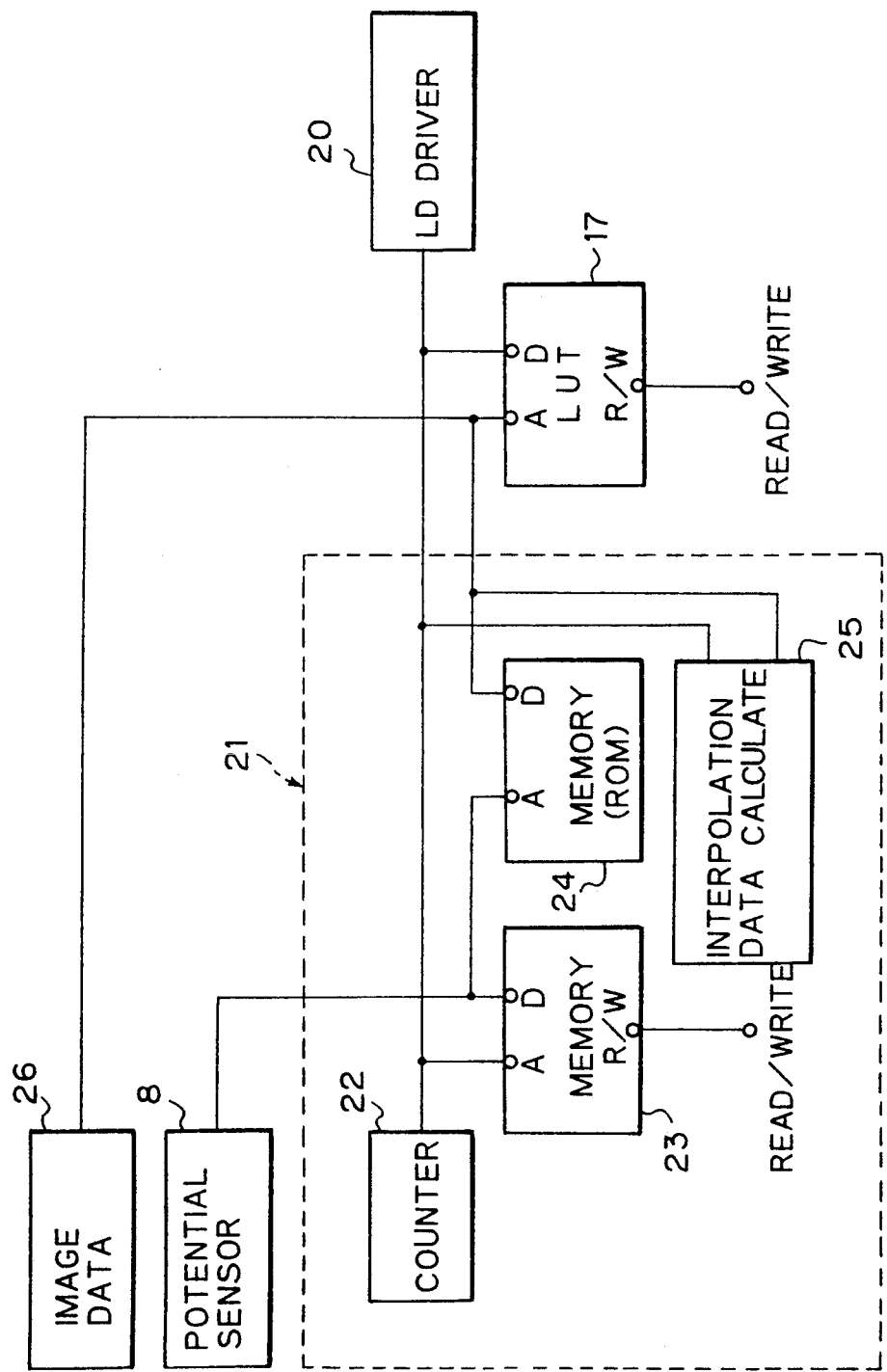
FIG. 5 is a block diagram showing a specific construction of a correction data setting section and associated components.

Referring to FIG. 5, the correction data setting section of FIG. 2 and components associated therewith are shown specifically. The correction data setting section, generally 21, has a counter 22, a memory 23 connected to the potential sensor 8 and counter 22, a memory 24 connected to the potential sensor 8 and memory 23, and an interpolation data calculating unit 25 which produces data for interpolation on the basis of the output of the counter 22 and image data 26. The memory 23 is implemented as a RAM. The LUT 17 is connected to this section 21 to store the output of the calculating unit 25, memory 24, or counter 22. The memory 23 and LUT 17 each is selectively caused into either one of a read mode and a write mode by a read/write signal.

Figure 6A:
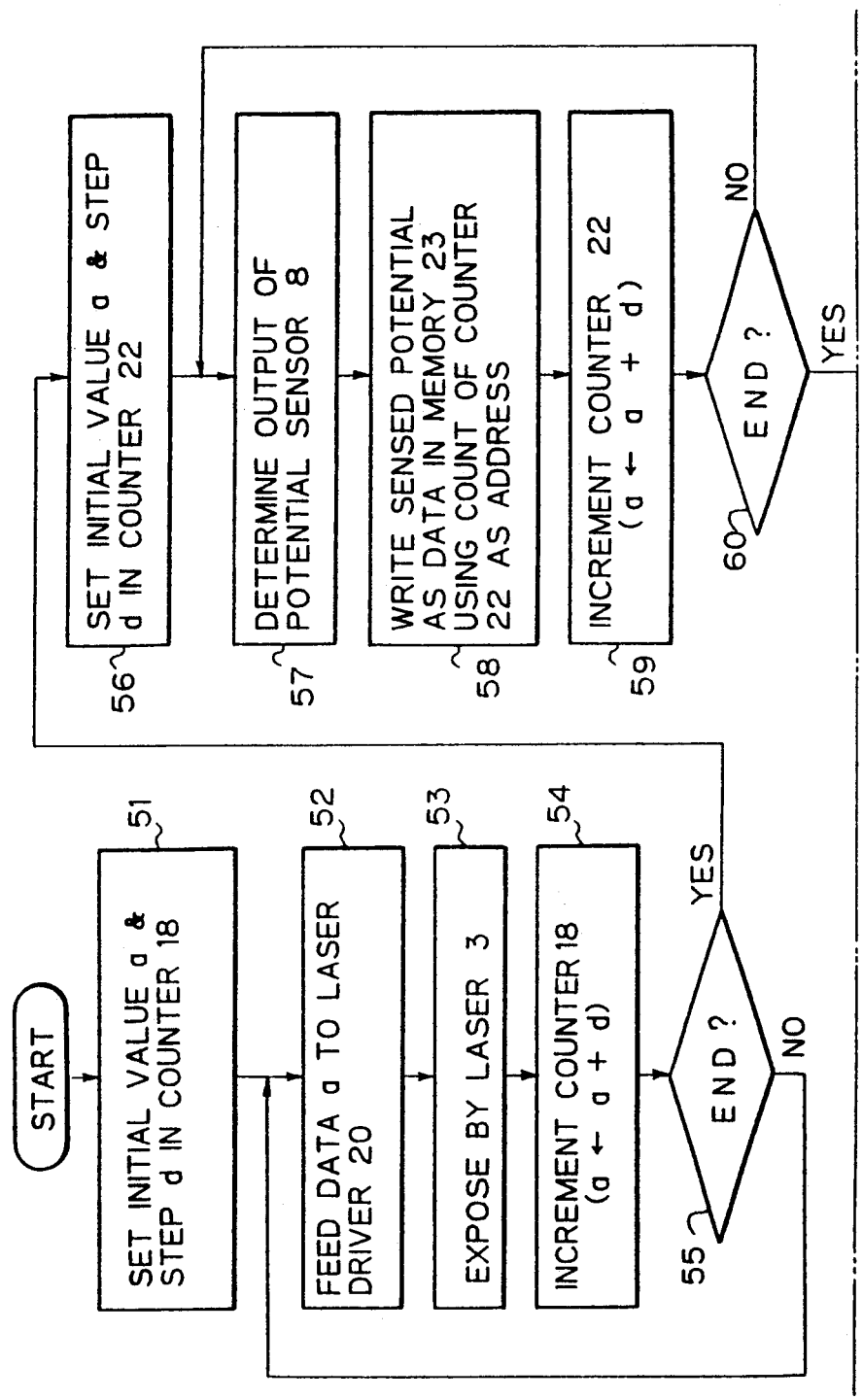
FIGS. 6A and 6B constitute a flowchart demonstrating a specific operation of the correction data setting section.
Figure 6B:
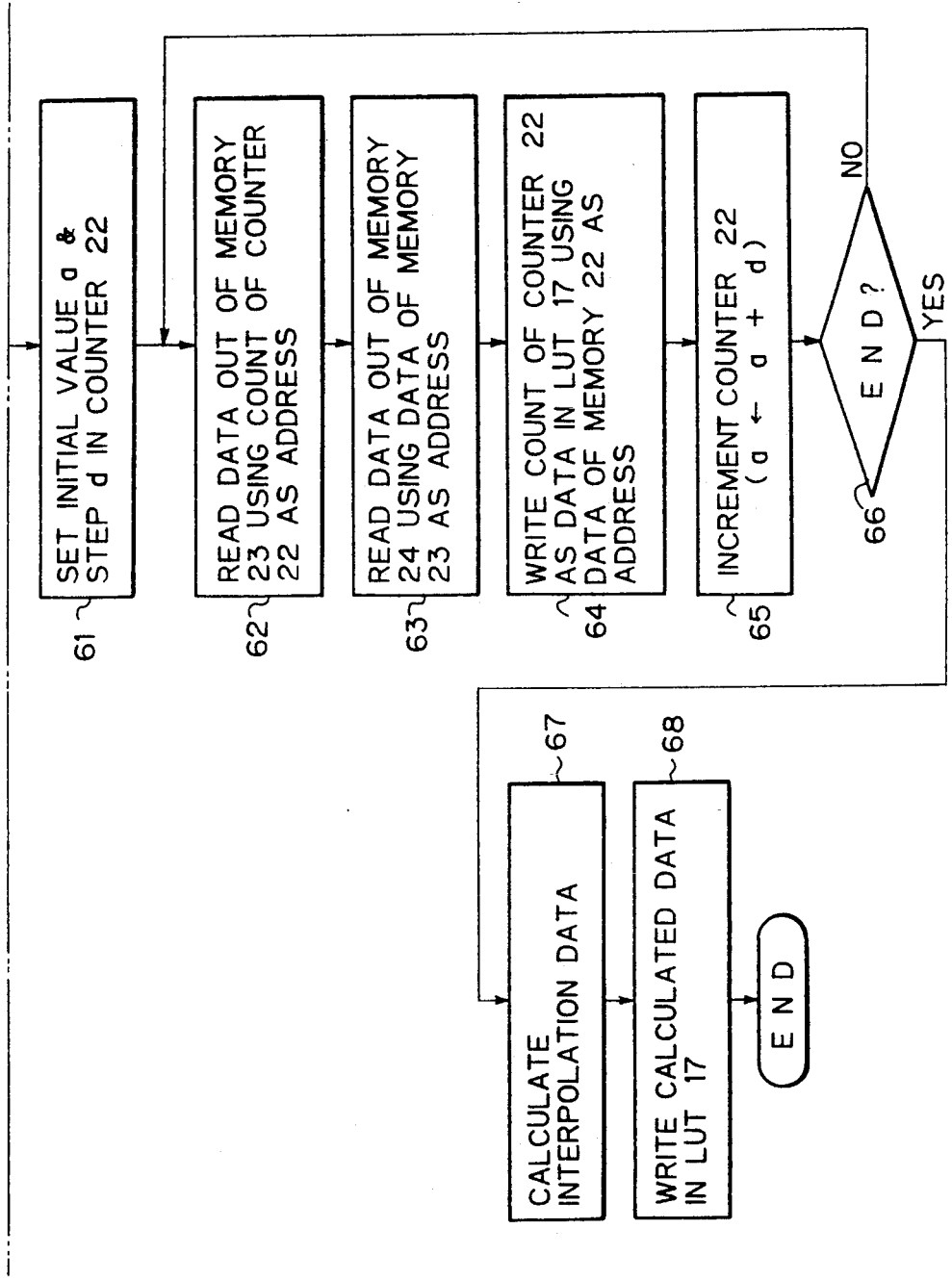

A specific operation of the correction data setting section 21 will be described with reference to FIG. 6. The operation begins with a step 51 for setting an initial value a and an increment d of tone data in the counter 18, FIG. 2. Then, the initial value a is fed to the laser driver 20 (step 52) to cause the semiconductor laser 3 to emit. As a result, a latent image or halftone pattern is formed over a predetermined area on the drum 2 (step 53). The tone data is sequentially incremented to form other electrostatic patterns on the drum 2 (steps 54 and 55). Thereafter, the initial value a and increment d of the tone data are set in the counter 22 of the correction data setting section 21 (step 56). The output potential of the potential sensor 8 is detected (step 57) and, by using the count of the counter 22 as an address, written to the memory 23 (step 58). Such a procedure is repeated a given number of times corresponding to the number of tones, i.e., the number of times that the laser 3 is driven. Subsequently, the initial value a and increment d are set in the counter 22 (step 61). By using the count of the counter 22 as an address, corresponding data is read out of the memory 23 (step 62). Then, by using the data read out as an address, corresponding data is read out of the memory 24 (step 63). Further, by using the data read out of the memory 24 as an address, the count of the counter 22 is written to the LUT 17 as data (step 64). This operation is repeated a given number of times corresponding to the set number of tones (steps 65 and 66). After the step 66, data to be written to empty addresses of the LUT 17 are determined by interpolation on the basis of the previously determined data (step 67) and then written to the LUT 17 (step 68).

Figure 7A:
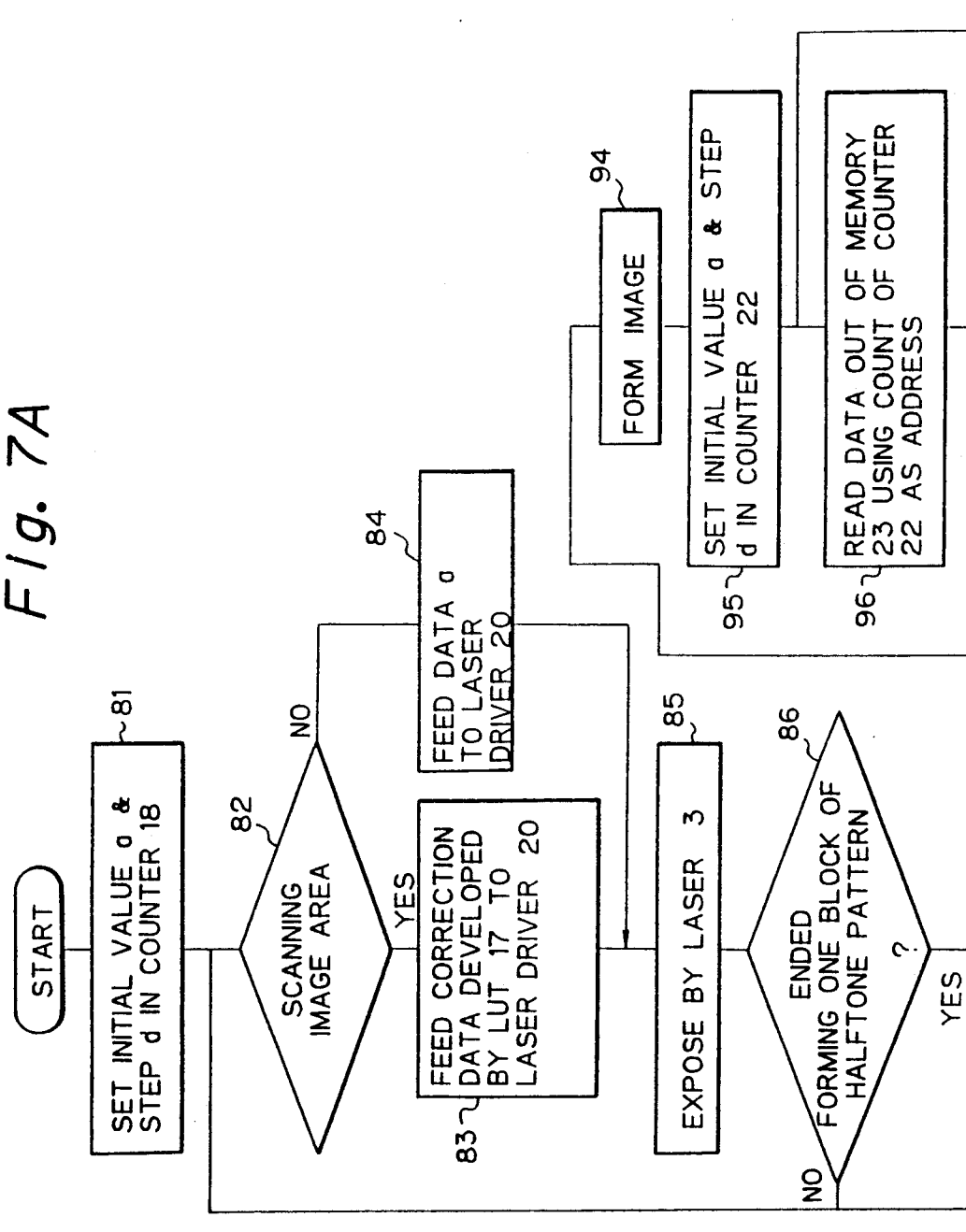
FIGS. 7A and 7B constitute a flowchart representative of another specific operation of the correction data setting section.
Figure 7B:
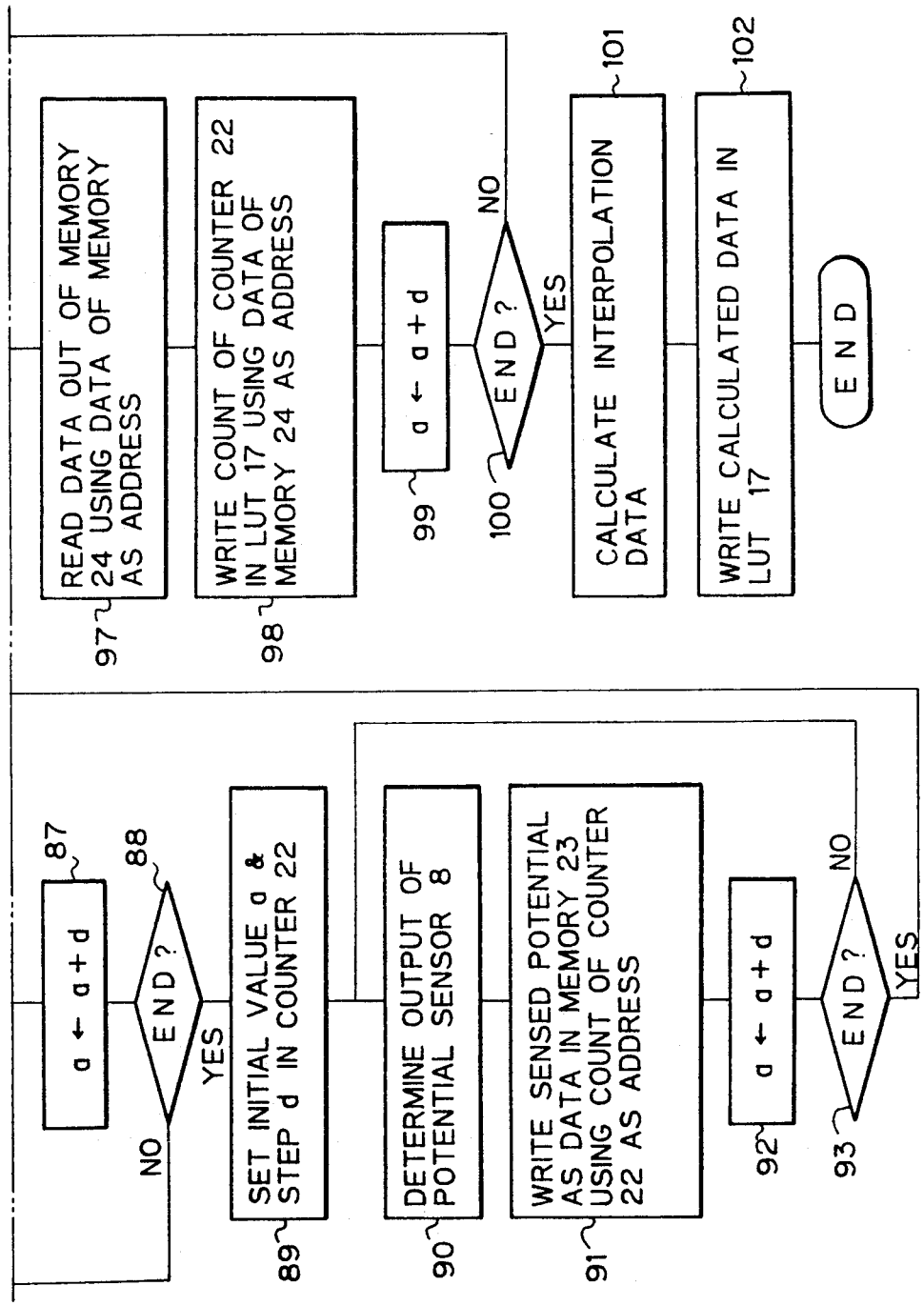

A reference will be made to FIG. 7 for describing another specific operation of the correction data setting section 21. As shown in FIG. 7, an initial value a and an increment d of tone data is set in the counter 18, FIG. 2, (step 81). Whether the position being scanned by the laser 3 lies in an image area or in a non-image area on the drum 2 is determined (step 82). If the position of interest lies in an image area, image data corrected by the LUT 17 is fed to the laser driver 20 (step 83). If otherwise, the initial value a of the tone data set by the counter 22 is fed to the laser driver 20 (step 84). As a result, the laser 3 emits a beam (step 85) to form a latent image or halftone pattern over a particular area on the drum 2. This procedure is repeated over a predetermined number of scanning lines (hereinafter referred to as a block). When this processing is completed as determined in a step 86, the tone level is incremented (a+d) (step 87) to form another latent image in the same manner (step 88). At this instant, a latent image based on image data and a latent image pattern whose tone varies stepwise are formed in the image area and the non-image area, respectively. Subsequently, the initial value a and increment d of the tone data are set in the counter 22 of the setting section 21 (step 89), and the output of the potential sensor 8 is read (step 90). By using the count of the counter 22, the output of the potential sensor 8 is written to the memory 23 as data (step 91). Thereafter, the tone level is incremented (a+d) (step 92). This operation is repeated by a given number of times corresponding to the number of tones (step 93). This is followed by a step 94 for causing the developing unit 9 to develop the latent image formed in the image area by an electrophotographic process. The developed image is transferred to a paper sheet and then fixed, as stated earlier.

After the step 94, a step 95 is executed for setting the initial value a and increment d in the counter 22. By using the count (a) of the counter 22 as an address, corresponding data is read out of the memory 23 (step 96). By using the data read out of the memory 23 as an address, corresponding data is read out of the memory 24 (step 97). Further, by using the data read out of the memory 24 as an address, the count of the counter 22 is written to the LUT 17 (step 98). Such a sequence of steps is repeated until the set number of tones is reached. (steps 99 and 100). After the step 96, data to be written to empty addresses of the LUT 17 are determined by interpolation on the basis of the previously determined data (step 101) and then written to the LUT 17 (step 102).

The memory 24 is implemented as a ROM and stores a relation between the surface potential (mean value) of the drum 2 and the density of a developed image (developing characteristic). Specifically, a particular image density exists in an address representative of a particular surface potential. Hence, the value turned out to be the address of the LUT 17 is the image density which should be outputted, and the data stored therein is the non-corrected tone data. As a result, the LUT 17 stores a reverse function of non-corrected image density and tone data, i.e., a correction function.

The operation described above sets up a linear relation between the tone of input image data and the density of a recorded image. This relation (gamma) may be set as desired. All that is required is inserting a memory storing a gamma characteristic between the memory 24 and the LUT 17.

Figure 8:
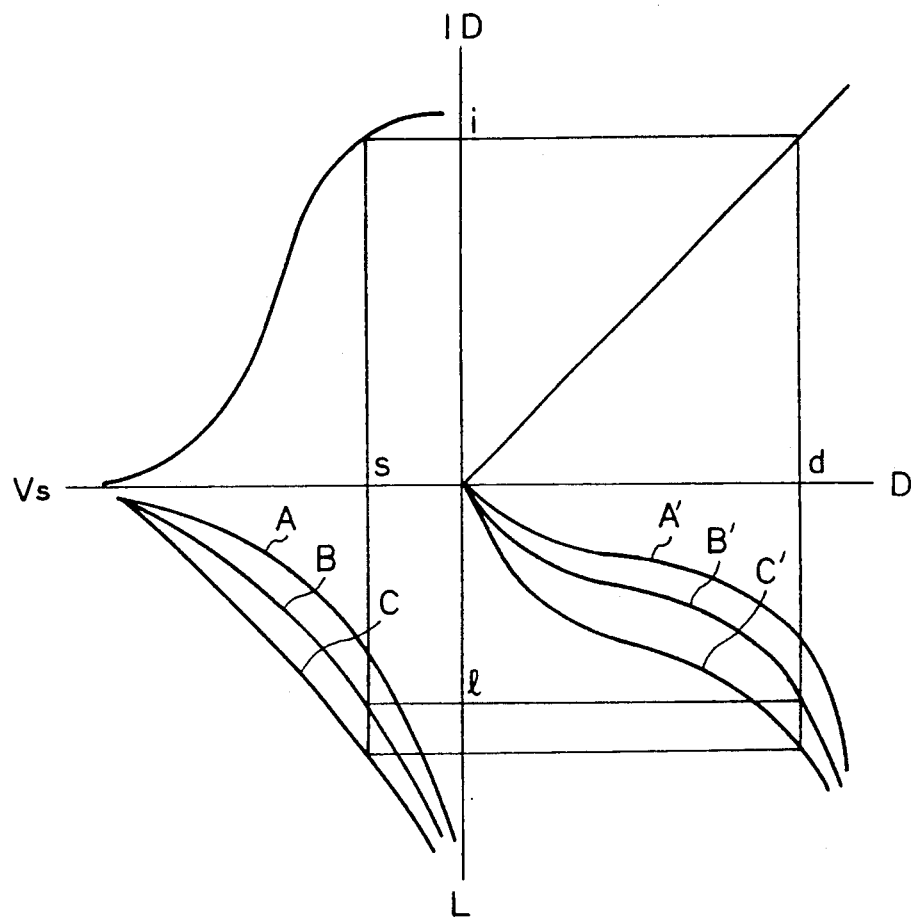
FIG. 8 shows characteristics in terms of a relation of the characteristics of individual steps executed by the correction data setting section.

FIG. 8 indicates the above-described operation in terms of a relation of the characteristics of the successive steps to one another. In FIG. 8, the first quadrant and the second quadrant indicate respectively a desired relation between tone data D and image density ID and a relation between surface potential Vs and image density ID (i.e. developing characteristic). Assume that the laser drive data L inputted in the correction data generating mode and the surface potential Vs are related as shown in the third quadrant of FIG. 8. Then, the surface potential s associated with the laser drive data l is written to the memory 23 while the image density i associated with the surface potential s is written to the memory 24, and this image density i is coincident with the tone data d. Hence, the tone data d and the laser drive data l should be related as shown in the fourth quadrant. This will be clear since the LUT 17 uses the image density i as an address and the laser drive data l as data. The laser drive data l is converted into an emission time by the laser driver 20 while, in the case of power modulation, it is converted into a current. Correction curves A', B' and C' are associated with latent image forming characteristics A, B and C, respectively. The contents represented by the curves A', B' and C' are written to the LUT 17.

Figure 9:
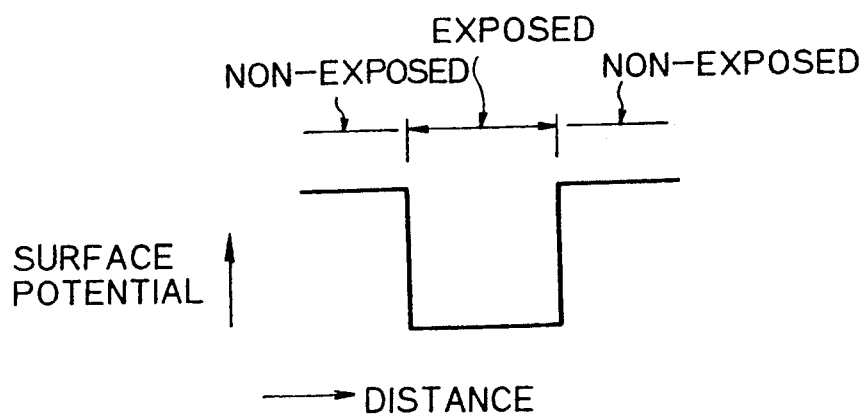
FIG. 9 shows a surface potential distribution associated with an ideal rectangular latent image which does not use medium levels.
Figure 10:
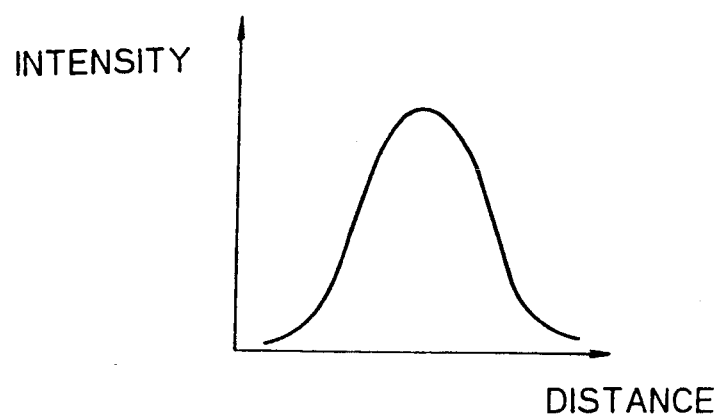
FIG. 10 shows an intensity distribution representative of an actual spatial distribution of a laser beam.
Figure 11A:
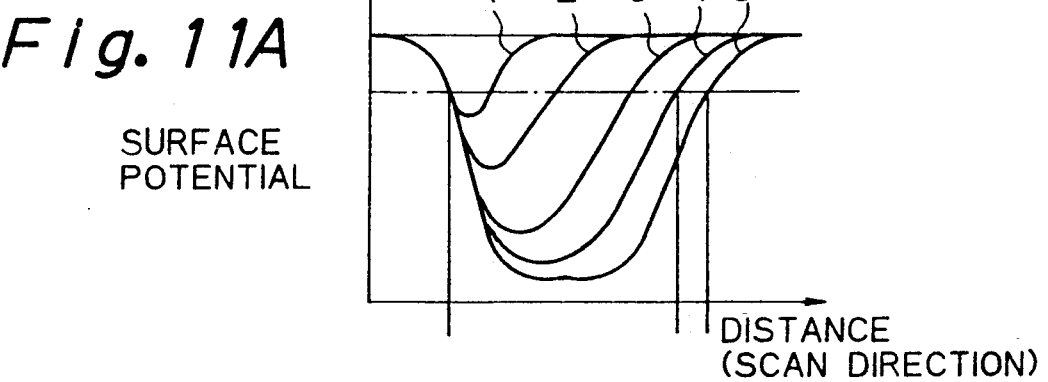
FIGS. 11A and 11B show respectively a relationship between surface potential and distance attainable with the present invention and the shapes of portions each being lower than a particular surface potential.
Figure 11B:
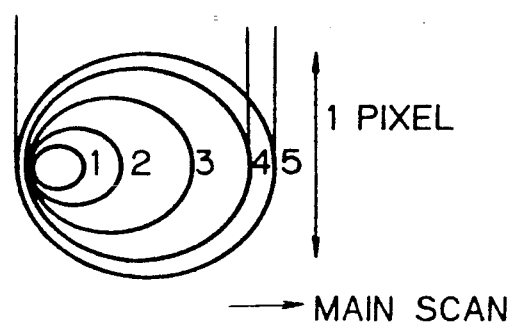

Regarding pulse width modulation, a tone should ideally be represented only by an area of a pixel which is exposed. It is therefore necessary to form a rectangular latent image which does not use medium levels, as shown in FIG. 9. In practice, however, a laser beam has a Gaussian spatial distribution or skirt characteristic, as shown in FIG. 10. Suppressing the skirt is not easy, if not impossible, since it poses considerable limitations and requirements in the structural aspect. For this reason, a beam distributed as shown in FIG. 10 has customarily been subjected to pulse width modulation. The resultant latent images are shown in FIG. 11A in which the numerals 1 to 5 indicate tones. FIG. 11B show two-dimensionally the shapes of portions each being lower than a particular surface potential on a level basis.

Figure 12:
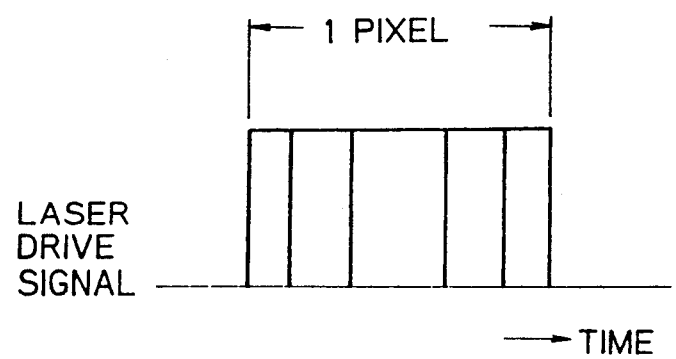
FIG. 12 shows pulse widths of a laser drive signal and is associated with FIGS. 11A and 11B.

Such a latent image pattern is formed by a laser drive signal shown in FIG. 12. Specifically, the pulse width of the laser drive signal is controlled to form any of the latent images shown in FIGS. 11A and 11B. As FIGS. 11A and 11B indicate, a change in tone level causes not only the exposed area but also the potential itself to change. Therefore, the relation between the emission time and the average potential of a latent image is complicated. Moreover, such a relation is effected by the relation between the current and the emission intensity of the laser 3 and the relation between the amount of exposure and the surface potential of the drum 2 (optical attenuation characteristic) and is therefore apt to change. Controlling the individual relations one by one is difficult. Nevertheless, when such interlinked system characteristics are considered, the control is relatively easy to achieve, as stated above.

Figure 13:
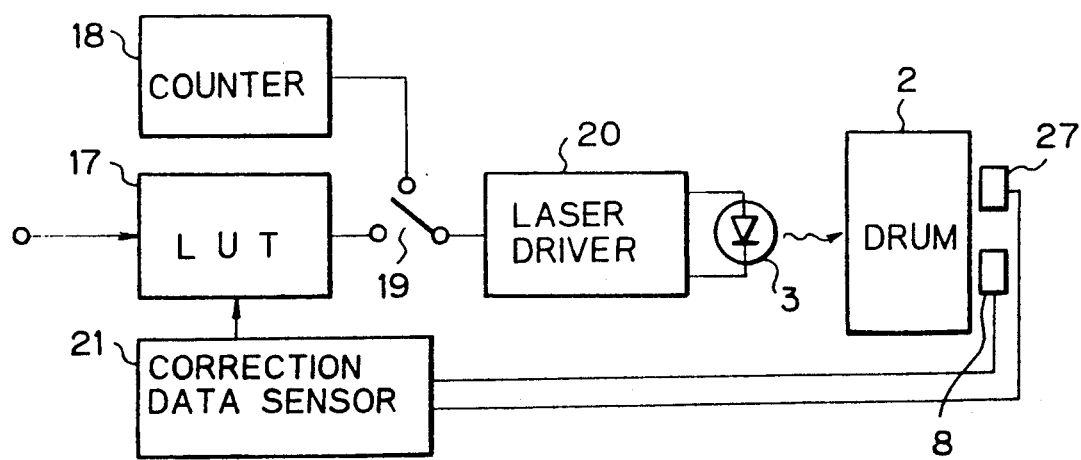
FIG. 13 is a block diagram showing another specific construction of the tone correcting section.

Referring to FIG. 13, another specific construction of the tone correcting section of FIG. 1 is shown. In FIG. 13, the same components as the components shown in FIG. 2 are designated by like reference numerals, and redundant description will be avoided for simplicity. The tone correcting section of FIG. 13 is characterized in that a reflection density sensor 27 is located in close proximity to the drum 2, and in that the output of the sensor 27 is fed to the correction data setting section 21 together with the output of the potential sensor 8.

In operation, in the event of image forming, the switch 19 is caused into connection with the counter 18 when the semiconductor laser 3 scans the non-image are of the drum 2. As a result, the laser drive data is fed from the counter 18 to the laser driver 20. When the laser 3 scans the image area of the drum 2, the switch 19 is connected to the LUT 17 to form a latent image in response to image data. Such a procedure is repeated during each scanning. When main scanning is completed by a predetermined number of times, the counter 18 converts the laser drive data to be fed to the laser driver 20 into a current and thereby causes the laser 3 to emit. On the other hand, in the case of power modulation, the laser driver 20 converts the input data into a pulse width to control the duration of a particular current through the laser 3 and thereby causes the laser 3 to emit. As a result, a latent image whose potential varies stepwise is formed on the drum 2. FIG. 3 shows an example of such a latent image, i.e., a condition (latent image pattern) wherein the average potential of the drum 2 is changed stepwise (tones 1 to n). In this embodiment, the potential sensor 8 also senses the potential of the latent image formed by power modulation on the drum 2 over a predetermined area. Thereafter, the correction data setting section 1 calculates, in response to the output of the sensor 8, the correction data for correcting image data which should be outputted from the LUT 17. The correction data are written to the LUT 17. In the event of image recording, the switch 19 is caused into connection with the LUT 17. Then, input image data is corrected and applied to the laser driver 20, whereby the relation between the tone of image data and the average potential is maintained constant.

Figure 14:
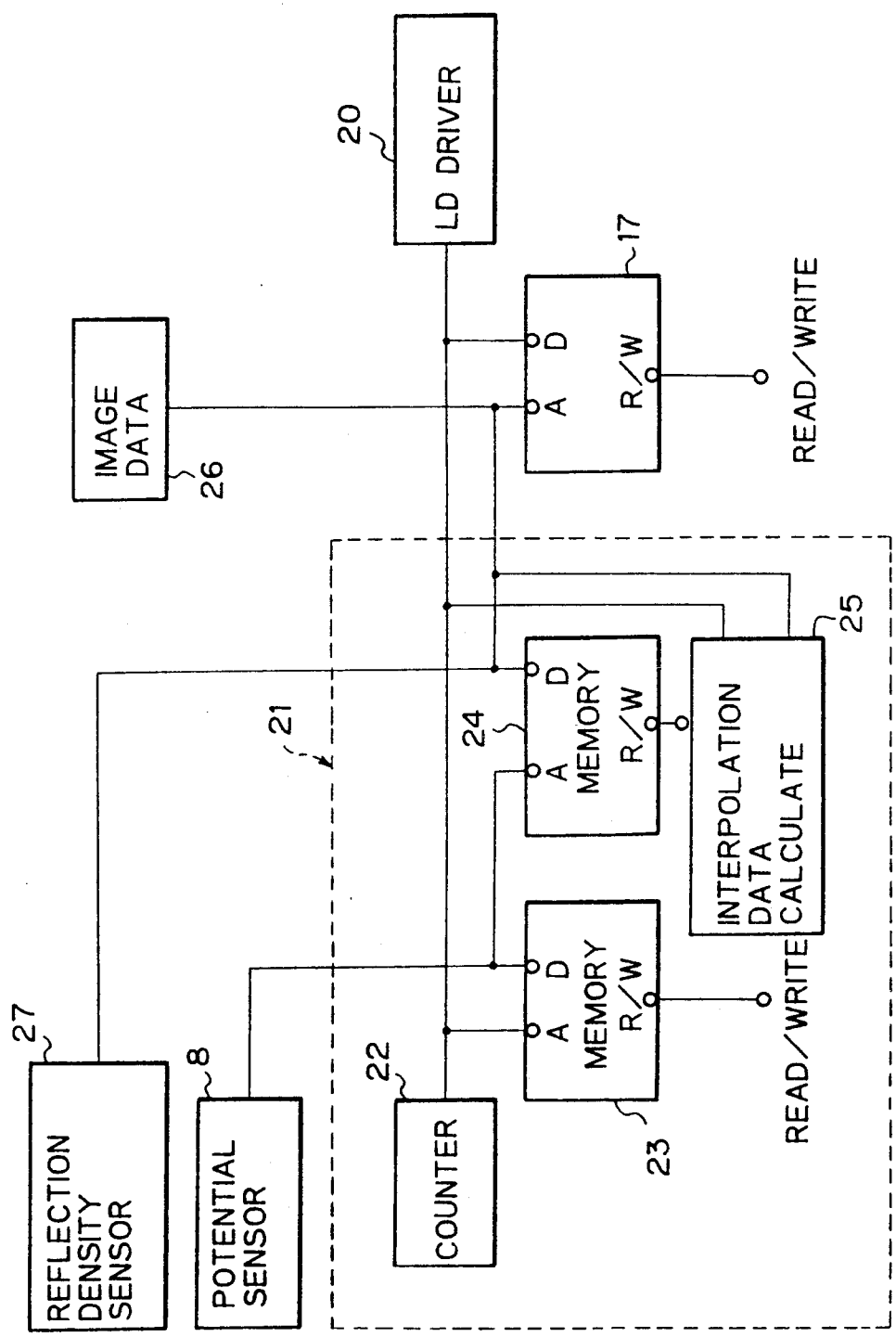
FIG. 14 is a block diagram showing a specific construction of a correction data setting section of FIG. 13 together with components associated therewith.

FIG. 14 shows the correction data setting section 21 of FIG. 13 together with components associated therewith in detail. In FIG. 14, the same components as the components shown in FIG. 5 are designated by like reference numerals, and redundant description will be avoided for simplicity. The arrangement of FIG. 14 differs from that of FIG. 5 in that the output of the reflection density sensor 27 is coupled to the data terminal of the memory 24. The memories 23 and 24 and LUT 17 each is selectively operable in a read mode and a write mode in response to a read/write signal.

Figure 15A:
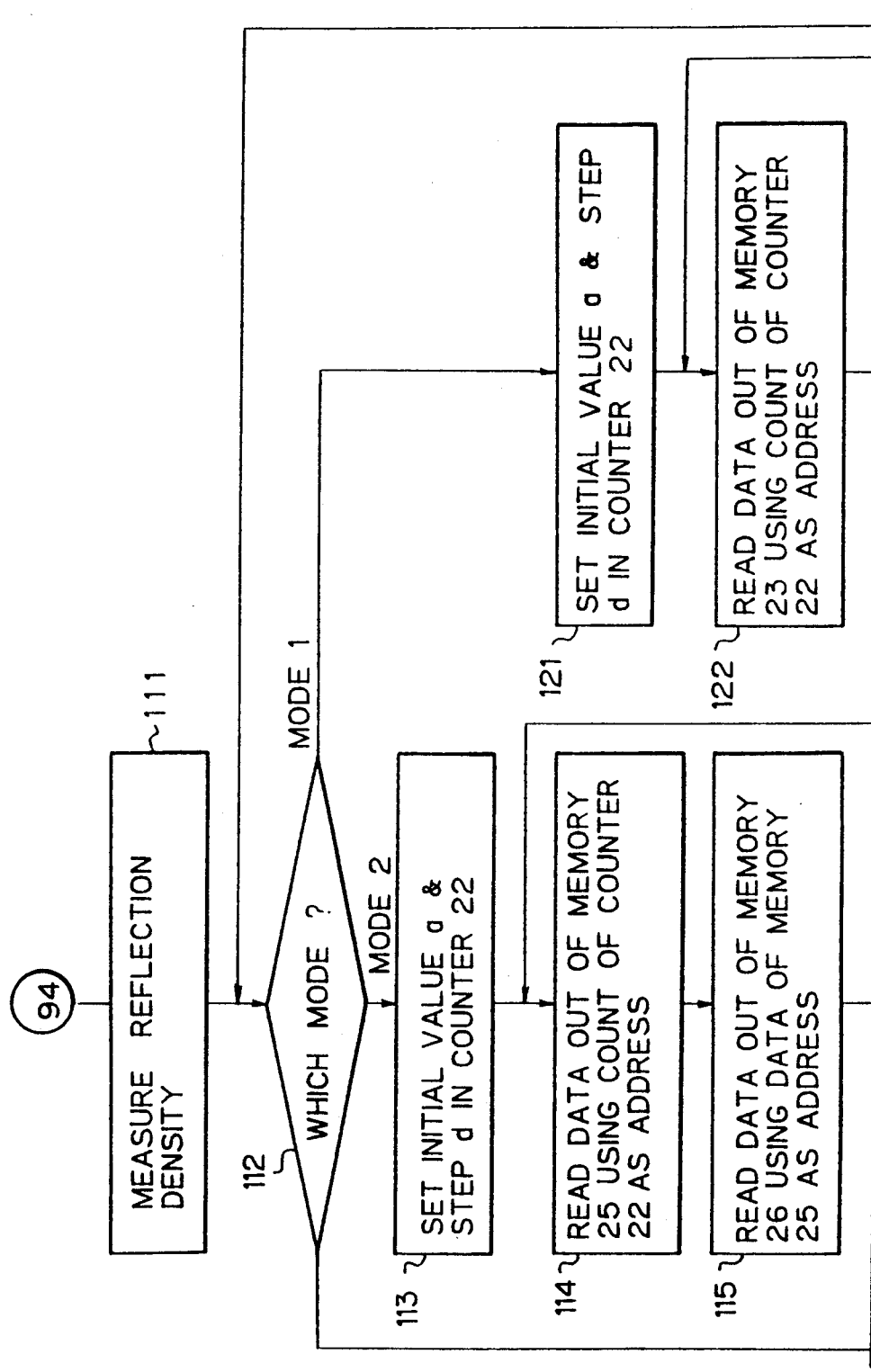
FIGS. 15A and 15B constitute a flowchart demonstrating a specific operation of the correction data setting of FIG. 13.
Figure 15B:
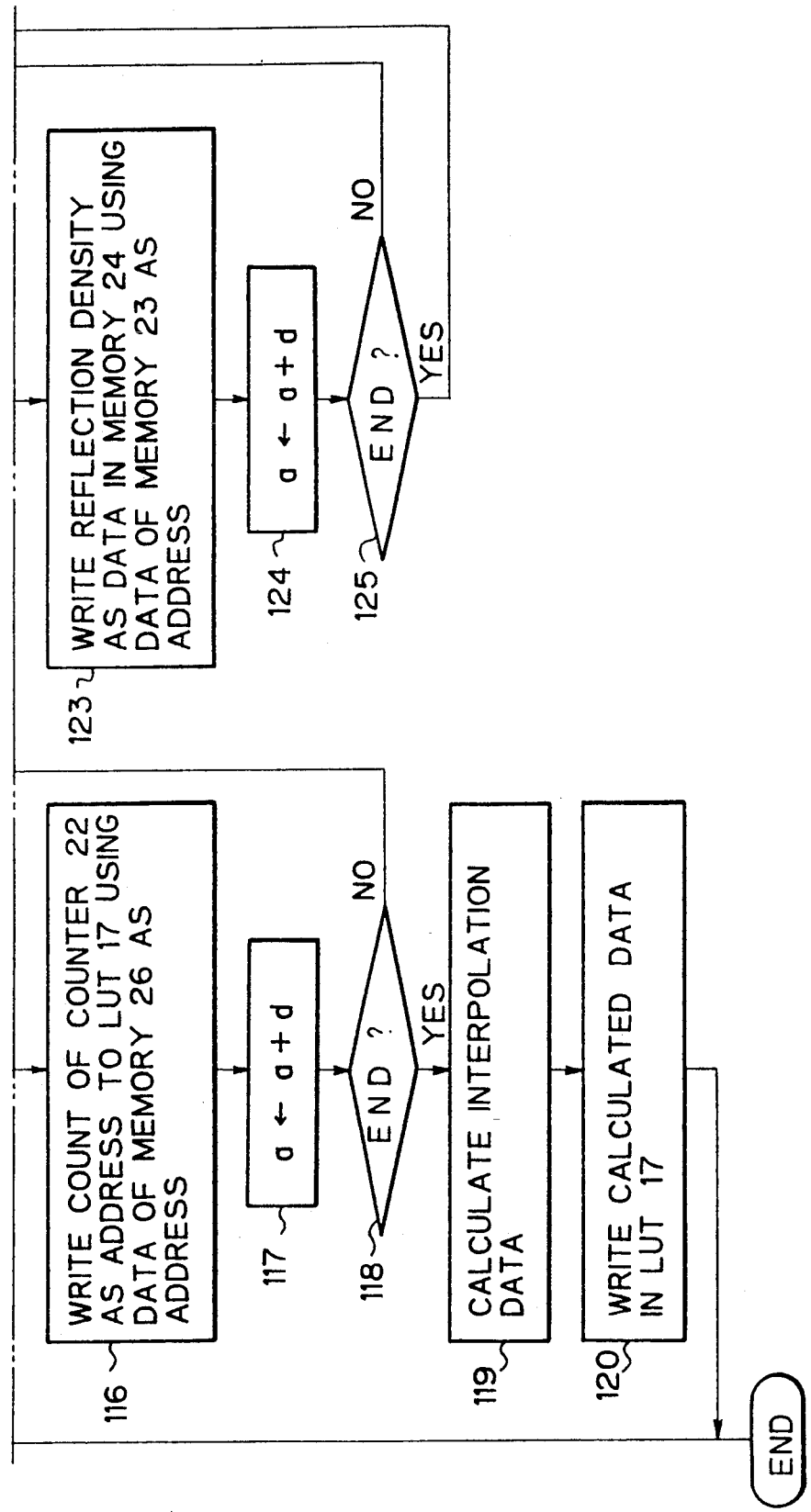

The operation of the correction data setting section 21 shown in FIG. 14 will be described with reference to FIG. 15. The specific procedure depicted in FIG. 14 is the same as the procedure of FIG. 7 as to the steps 81 to 94.

After a latent image has been formed in the step 93, the developing unit 9 develops the latent image formed in the image area of the drum 2 by the electrophotographic process. The developed image, or toner image, is transferred to a paper sheet and then fixed on the paper sheet to produce a reproduction (step 94). At the same time, the latent image formed in the non-image area of the drum 2 is also developed, but this developed image is not transferred to the paper sheet. The density sensor 27 senses the reflection density of the toner image existing in the non-image area of the drum 2 (step 111), and the sensed reflection density is written to the memory 24.

A first condition set mode 1 for developing tone correction data is executed as follows. When the first condition set mode 1 is identified (step 112), the initial value a and increment d of the tone data are again set in the counter 22 (step 113). By using the count of the counter 22 as an address, data is read out of the memory 23 (step 114). By using the data read out of the memory 25, corresponding data is read out of the memory 26 (step 115). Further, by using the data read out of the memory 26, the value of the counter 22 is written to the LUT 17 (step 116). Such a procedure is repeated a given number of times corresponding to the number of set tones (steps 117 and 118).

The memory 24 stores a relation between the surface potential of the drum 2 and the density of a developed image (developing characteristic), i.e., an image density exists in an address representative of a surface potential. Hence, the value turned out to be the address of the LUT 17 is the image density which should be outputted, and data stored therein is non-corrected tone data. It follows that a reverse function of non-corrected image density and tone data, i.e., a correction function is written to the LUT 17 (steps 119 and 120).

The operation described above is effected to set up a linear relation between the tone of input image data and the density of a recorded image. This relation (gamma) can be set as desired. All that is required is inserting a memory having a gamma characteristic between the memory 24 and the LUT 17.

The tone data written to the LUT 17 by the above procedure will be referenced when the next image is to be formed.

A second condition set mode 2 for writing the developing characteristic to the memory 24 is executed as follows. When the second condition set mode 2 is identified (step 112), the initial value a and increment d of the tone data are set in the counter 22 (step 121). By using the count of the counter 22 as an address, corresponding data, or surface potential, is read out of the memory 23 (step 122). By using the data read out of the memory 23 as an address, a sensed reflection density is written to the memory (step 123) while the counter 22 is incremented (a+d) (step 124). When the second condition set mode 2 is completed, the program returns to the step 112 and may enter into the first condition set mode 1 (step 125).

Figure 16:
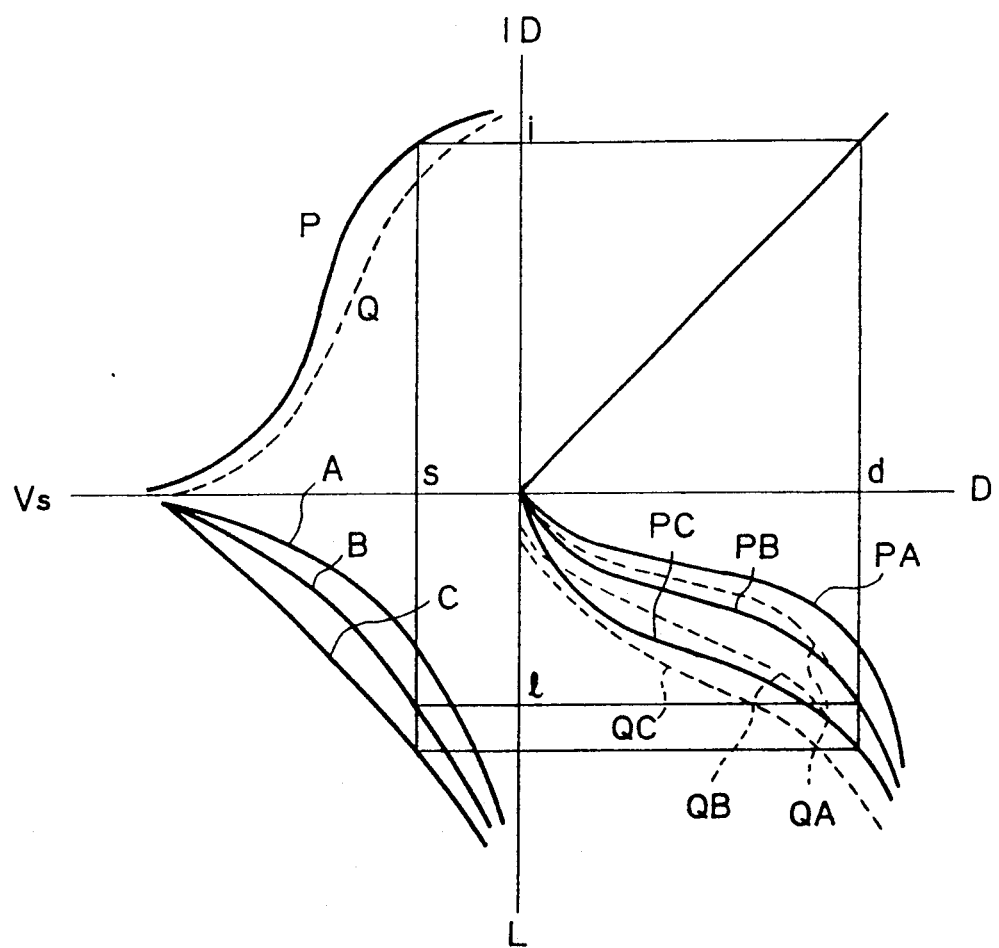
FIG. 16 shows characteristics in terms of a relation of various steps executed by the correction data setting section of FIG. 13.

FIG. 16 presents the operations described above in terms of a relation of the characteristics of the individual steps to one another. Specifically, FIG. 16 shows a desired relation between tone data D and image density ID in the first quadrant and a relation between surface potential Vs and the image density ID (i.e. developing characteristic) in the second quadrant. Assume that the laser drive data L inputted in the correction data generating mode and the surface potential Vs are related as shown in the third quadrant. Then, a surface potential s associated with laser drive data l is written to the memory 23 while an image density i associated with the surface potential s is written to the memory 24, and this image density i coincides with the tone data d. Therefore, the tone data d and the laser drive data l should be related as shown in the fourth quadrant. This will be clear since the LUT 17 operates by using the laser drive data as data. In the case of power modulation, the laser drive data will be converted into a current by the laser driver 20 while, in the case of pulse width modulation, it will be converted into an emission time.

As FIG. 16 indicates, when the developing characteristic shown in the second quadrant is changed, it is necessary to change the tone correction data of the fourth quadrant. In this example, the required characteristic indicated in the first quadrant is achievable at all times only if a change in developing characteristic is taken into account in the event of the generation of tone correction data. In FIG. 16, developing characteristics P and Q and latent image forming characteristics A, B and C may be combined to produce six correction curves PA, PB, PC, QA, QB and QC. As a result, the contents represented by the correction curves QA, QB and QC are written to the LUT 17.

Regarding pulse width modulation, halftone should ideally be represented by an area of a pixel which is exposed. It is therefore necessary to form a rectangular latent image which does not use medium levels, as shown in FIG. 9. In practice, however, a laser beam has a Gaussian spatial distribution or skirt characteristic, resulting in a latent image shown in FIG. 11A. Such a latent image pattern is produced by the laser drive signal shown in FIG. 12. Hence, the latent images shown in FIGS. 11A and 11B each is formed by controlling the pulse width of the laser drive signal.

In any of the specific constructions and operations described above, the semiconductor laser 3 has 8-bit information per pixel and, therefore, allows a current or a pulse width to carry the same amount of information. This may be implemented with a method taught in previously mentioned Japanese Patent Laid-Open Publication No. 204741/1989, in which case the latent image has 256 tones. While the various modes have been shown and described as being executed in a parallel relation, they may be executed one by one. Then, it is not necessary to discriminate the non-image area and the image area from each other. The data writing to the LUT 17 may be effected before the start of image recording, immediately after the turn-on of a power switch, during warm-up operation, at predetermined intervals, etc. Further, the data writing to the LUT 17 can be effected in parallel with image recording to save time while insuring optimum latent image forming conditions.

In summary, it will be seen that the present invention provides an image recording apparatus which reproduces images stably despite a great number of tones assigned to each pixel, insuring faithful tone reproducibility and high resolution. In addition, the apparatus of the present invention allows any desired relation (gamma characteristic) to be set up between the tone of input image data and the density of a recorded image.

Various modifications will become possible for those skilled in the art after receiving the teachings of the present disclosure without departing from the scope thereof.

What is claimed is:

1. An image recording apparatus for electrostatically forming a latent image on a photoconductive element by scanning said photoconductive element by a laser beam emitted by a semiconductor laser driven by image data, and developing said latent image to produce a visible image, said apparatus comprising:

first driving means for driving the laser by modulating a pulse width by multiple levels which are based on the image data;

second driving means for driving, before the visible image is formed, said first driving means by generating laser drive data having a plurality of tones;

potential sensing means for sensing a surface potential of a latent image electrostatically formed on the image carrier by said second driving means; and table generating means for generating, in response to a potential sensed by said potential sensing means, a table for correcting image data such that a set relation holds between continuous tone data and latent image potential, the table generating means including an interpolation data calculating unit which produces interpolation data on the basis of (1) an output of a counter within the table generating means and (2) the image data.

2. An image recording for electrostatically forming a latent image on a photoconductive element by scanning said photoconductive element by a laser beam emitted by a semiconductor laser driven by image data, and developing said latent image to produce a visible image, said apparatus comprising:

first driving means for driving the laser by modulating a drive current for driving said laser by multiple levels which are based on the image data;

second driving means for driving, before the visible image is formed, said first driving means by generating laser drive data having a plurality of tones;

potential sensing means for sensing a surface potential of a latent image electrostatically formed on the image carrier by said second means; and table generating means for generating, in response to a potential sensed by said potential sensing means, a table for correcting image data such that a set relation holds between continuous tone data and latent image potential, the table generating means including an interpolation data calculating unit which produces interpolation data on the basis of (1) an output of a counter within the table generating means and (2) the image data.

3. An image recording apparatus for modulating a drive current or an emission time in multiple levels in response to image data to drive a semiconductor laser, scanning a photoconductive image carrier by a laser beam issuing from said laser to electrostatically form a latent image on said image carrier, and developing said latent image to produce a visible image, said apparatus comprising:

latent image forming means for electrostatically forming a latent image in an image forming area of the image carrier in response to the image data, and electrostatically forming a latent image having a plurality of tones for tone correction in a non-image forming area of said image carrier;

potential sensing means for sensing a potential of said latent image formed in the non-image forming area by said latent image forming means; and table generating means for generating, in response to a potential sensed by said potential sensing means, a table for correcting image data such that a set relation holds between continuous tone data to drive said laser and latent image potential, the table generating means including an interpolation data calculating unit which produces interpolation data on the basis of (1) an output of a counter within the table generating means and (2) the image data.

4. An image recording apparatus for modulating a drive current or an emission time in multiple levels in response to image data to drive a semiconductor laser, scanning a photoconductive image carrier by a laser beam issuing from said laser to electrostatically form a latent image on said image carrier, and developing said latent image to produce a visible image, said apparatus comprising:

latent image forming means for electrostatically forming a latent image in an image forming area of the image carrier in response to the image data, and electrostatically forming a latent image having a plurality of tones for latent image tone correction in a non-image forming area of said image carrier;

potential sensing means for sensing a potential of said latent image formed in the non-image forming area by said latent image forming means;

first condition setting means for generating, in response to a potential sensed by said potential sensing means, a table for correcting image data such that a set relation holds between continuous tone data to drive said laser and latent image potential, the table generating means including an interpolation data calculating unit which produces interpolation data on the basis of (1) an output of a counter within the first condition setting means and (2) the image data;

reflection density sensing means for sensing a reflection density of toner development applied to said latent image formed by said latent image forming means; and second condition setting means for setting the tone relation between said potential of said latent image sensed by said potential sensing means and said reflection density of toner development sensed by said reflection density sensing means.

5. An image recording apparatus having data store means for storing a plurality of continuous tone data and control data associated with said continuous tone data, and drive means for controlling the drive of a semiconductor laser in response to control data output from said data store means, and performing a sequence of steps of outputting control data from said data store means on the basis of said output control data for thereby illuminating a photoconductive image carrier by a laser beam from said semiconductor laser to electrostatically form a latent image, and depositing a toner to said latent image to produce a toner image, said apparatus comprising:

a) data generating means for generating, before the formation of a toner image, correction control data corresponding to part of the plurality of continuous tone data;

b) potential sensing means for sensing the surface potential of a latent image formed on said image carrier; and c) correcting means for:
  (1) driving said drive means on the basis of said correction control data, causing said potential sensing means to sense the surface potential of an electrostatic latent image formed by the drive of said drive means; and
  (2) correcting, on the basis of the sensed surface potential, said control data of said data store means such that said continuous tone data and the potential of said latent image are held in a predetermined relation.

6. An apparatus as claimed in claim 5, wherein: said drive means drives said semiconductor laser by modulating a pulse width.

7. An apparatus as claimed in claim 5, wherein: said drive means drives said semiconductor laser by modulating a drive current.

8. An apparatus as claimed in claim 5, wherein: said image is electrostatically formed in a non-image area by said correction control data output by said data generating means.

9. An apparatus as claimed in claim 5, further comprising:

density sensing means for sensing the density of a toner image formed on said image carrier, said correcting means correcting said control data of said data store means in response to the density sensed by said density sensing means.

* * * * *